(12) United States Patent
Yamaguchi et al.

(10) Patent No.: US 7,982,901 B2
(45) Date of Patent: Jul. 19, 2011

(54) IMAGE PROCESSING APPARATUS, METHOD FOR MANAGING STORAGE AREA, AND COMPUTER PROGRAM PRODUCT

(75) Inventors: Takehisa Yamaguchi, Ikoma (JP); Minako Kobayashi, Ikeda (JP); Hirohisa Miyamoto, Kobe (JP); Katsuhiko Akita, Amagasaki (JP); Okihisa Yoshida, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 793 days.

(21) Appl. No.: 12/049,762

(22) Filed: Mar. 17, 2008

(65) Prior Publication Data
US 2008/0239374 A1 Oct. 2, 2008

(30) Foreign Application Priority Data
Mar. 26, 2007 (JP) .................................. 2007-080311

(51) Int. Cl.
*G06K 7/06* (2006.01)
*G06K 15/00* (2006.01)
*G06F 3/12* (2006.01)
*G06F 3/00* (2006.01)

(52) U.S. Cl. ....... 358/1.16; 358/1.15; 358/1.1; 711/170; 235/441

(58) Field of Classification Search .................... 358/1.1, 358/1.15, 1.16, 448, 443, 404, 444, 1.18; 711/1.15, 1.1; 235/441
See application file for complete search history.

(56) References Cited

U.S. PATENT DOCUMENTS

| | | | |
|---|---|---|---|
| 7,801,029 B2 * | 9/2010 | Wrenn et al. .................. | 370/225 |
| 2002/0075845 A1 * | 6/2002 | Mullaney et al. ............. | 370/351 |
| 2004/0117579 A1 * | 6/2004 | Wu et al. ........................ | 711/170 |
| 2005/0226104 A1 * | 10/2005 | Nishida et al. ................ | 369/30.1 |
| 2006/0249580 A1 * | 11/2006 | Nishizawa et al. ........... | 235/441 |
| 2007/0124627 A1 * | 5/2007 | Katano et al. ................. | 714/708 |
| 2007/0226547 A1 * | 9/2007 | Takata et al. .................... | 714/48 |
| 2008/0181129 A1 * | 7/2008 | Beyers et al. ................. | 370/253 |
| 2010/0257313 A1 * | 10/2010 | Nishizawa et al. ........... | 711/115 |

FOREIGN PATENT DOCUMENTS
JP 10-254856 9/1998
(Continued)

OTHER PUBLICATIONS
Notification of Reason(s) for Refusal in JP 2007-080311 dated Mar. 10, 2009, and an English Translation thereof.

*Primary Examiner* — Jerome Grant, II
(74) *Attorney, Agent, or Firm* — Buchanan Ingersoll & Rooney PC

(57) ABSTRACT

An image processing apparatus (2) capable of providing a box for each user is provided. The image processing apparatus (2) includes a user grouping process portion (205) that determines a total of an amount of a box of a first user that has been used by a second user and an amount of a box of the second user that has been used by the first user, determines whether or not the total is equal to or greater than a predetermined amount, and groups both the users when the total is equal to or greater than the predetermined amount, and a box reset process portion (207) that performs a reset process for providing again the boxes of the grouped first user and the grouped second user in an identical image processing apparatus if the boxes are provided in different image processing apparatuses.

17 Claims, 13 Drawing Sheets

FOREIGN PATENT DOCUMENTS

| | | |
|---|---|---|
| JP | 2001-101039 | 4/2001 |
| JP | 2002-55797 A | 2/2002 |
| JP | 2005-223743 | 8/2005 |
| JP | 2005-244646 | 9/2005 |
| JP | 2005-269213 | 9/2005 |
| JP | 2006-295466 | 10/2006 |
| JP | 2007-193562 | 8/2007 |
| JP | 2007-306271 | 11/2007 |

* cited by examiner (EXTERNAL NETWORK)

| BOX ID | IP ADDRESS | DEVICE ID | USER ID | |
|---|---|---|---|---|
| B001 | 192.168.1.11 | M1 | U001 | ← DTA |
| B002 | 192.168.1.11 | M1 | U002 | ← DTA |
| B003 | 192.168.1.12 | M2 | U003 | ← DTA |
| B004 | 192.168.1.13 | M3 | U004 | ← DTA |
| ⋮ | ⋮ | ⋮ | ⋮ | |

FIG. 5

| DEVICE ID | FUNCTION | | | | |
|---|---|---|---|---|---|
| M1 | STAPLING | PUNCHING | WATERMARK | SCAN-TO-FTP | ... |
| M2 | STAPLING | COLOR PRINTING | PUNCHING | WATERMARK | ... |
| M3 | STAPLING | COLOR PRINTING | SCAN-TO-FTP | SCAN-TO-SMB | ... |
| ... | ... | ... | ... | ... | ... |

202

DTB DTB DTB DTB

| JOB ID | EXECUTION DATE AND TIME | USER ID | JOB TYPE | SUPPLIER BOX ID | SAVE DESTINATION BOX ID | NUMBER OF PAGES | DATA SIZE | COMMUNICATION START TIME | COMMUNICATION END TIME | USED FUNCTION | |
|---|---|---|---|---|---|---|---|---|---|---|---|
| J-1 | 1/12 10:30:20 | U033 | BOX DATA COPY | B014 | B008 | 4 | 23MB | 10:30:28 | 10:30:30 | - | DTC |
| J-2 | 1/12 10:43:55 | U053 | SCAN-TO-BOX | - | B013 | 12 | 70MB | 10:44:10 | 10:44:22 | SCAN-TO-BOX | DTC |
| J-3 | 1/12 11:03:11 | U091 | SCAN-TO-FTP | - | B029 | 8 | 52MB | 11:03:18 | 11:03:27 | SCAN-TO-FTP | DTC |
| J-4 | 1/12 11:04:22 | U028 | BOX PRINT | B023 | - | 14 | 84MB | - | - | COLOR, STAPLING | DTC |
| J-5 | 1/12 11:13:09 | U009 | SCAN-TO-SMB | - | B019 | 7 | 47MB | 11:13:15 | 11:13:22 | SCAN-TO-SMB | DTC |
| J-6 | 1/12 11:14:47 | U077 | REFERENCE TO LIST IN BOX | B031 | - | - | 100KB | 11:14:50 | 11:14:51 | - | DTC |
| ... | ... | ... | ... | ... | ... | ... | ... | ... | ... | ... | |

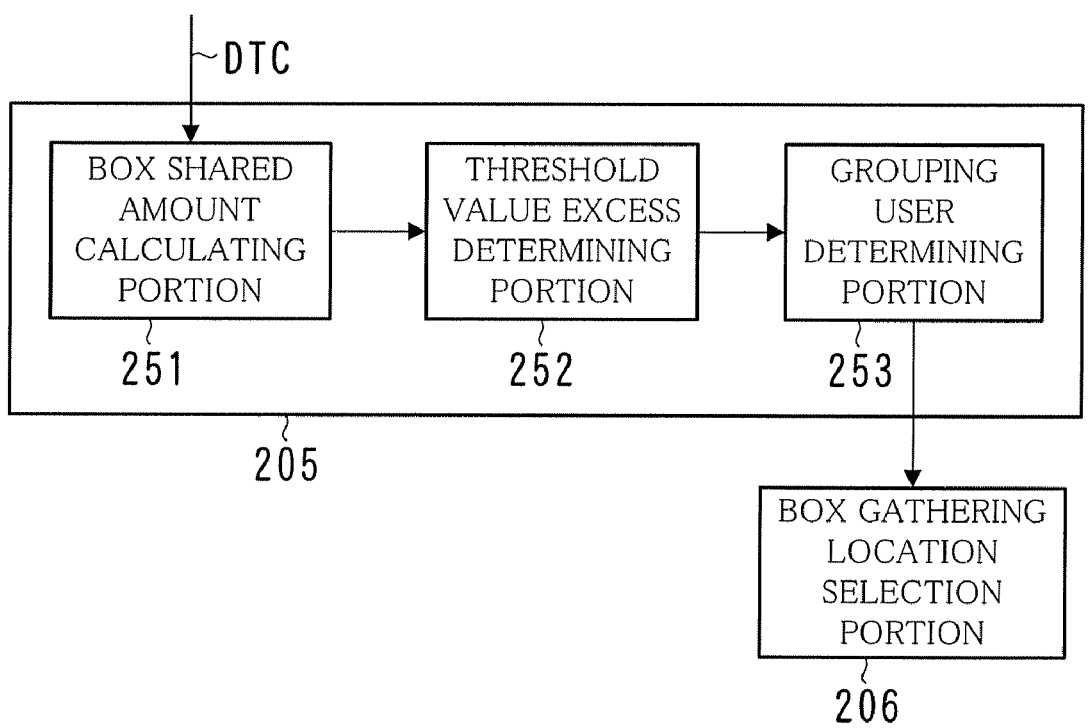

IMAGE PROCESSING APPARATUS, METHOD FOR MANAGING STORAGE AREA, AND COMPUTER PROGRAM PRODUCT

This application is based on Japanese patent application No. 2007-080311 filed on Mar. 26, 2007, the contents of which are hereby incorporated by reference.

BACKGROUND OF THE INVENTION

1. Field of the Invention

The present invention relates to an image processing apparatus called an MFP, a method for managing a storage area provided therein, and others.

2. Description of the Related Art

Image processing apparatuses called Multi Function Peripherals (MFPs) have come into widespread use in organizations such as government and corporate offices. The image processing apparatuses have various functions including a copier function, a scanner function, a network printing function and a fax function. Since the price of image processing apparatuses has recently been reduced, a plurality of image processing apparatuses can be easily installed on an intranet of an office.

For the purpose of using a plurality of image processing apparatuses efficiently, there is proposed a method described in Japanese unexamined patent publication No. 2002-055797.

According to this method, each piece of print outputting equipment calculates a waiting time based on the outputting capability thereof, the data quantity of inputted originals, and the number of items to be outputted, and sets the calculated waiting time in a table. Then, a client (computer) side refers to the respective tables of the registered outputting equipment before making a request for print, selects an output destination whose waiting time is shortest, and transmits the print data.

Image processing apparatuses have recently been equipped with a large-capacity hard disk drive and been used as document servers.

According to the document server function, each user using an image processing apparatus is given a storage area called, for example, a "box" or a "personal box" corresponding to a folder or directory in a personal computer, thereby enabling the user to store image data and others in the user's own storage area. This function is sometimes called a "box function".

Further, a user can copy data stored in the user's own storage area to a storage area of other user, copy data stored in a storage area of other user to the user's own storage area, and perform printing based on data stored in a storage area of other user. In short, a user can use a storage area of other user in various ways.

Furthermore, image processing apparatuses have become increasingly sophisticated, so that large-size data can be easily handled thereby. The size of data to be handled by image processing apparatuses will probably be increased in the future. Accordingly, communication traffic between image processing apparatuses will probably be increased.

The presence of a plurality of image processing apparatuses leads to distribution of storage areas of respective users to the image processing apparatuses installed in different places.

Under such a state, if a plurality of users frequently use each others' storage areas, communication traffic may be increased. For example, when a user having his/her storage area in an image processing apparatus 2A and a user having his/her storage area in an image processing apparatus 2B use each others' storage areas, communication traffic between the image processing apparatuses 2A and 2B is increased.

In view of the future increase in communication traffic due to the increase in data size, an approach for reducing communication traffic as much as possible is required in order to ensure the stability of a network system.

SUMMARY

The present disclosure is directed to solve the problems pointed out above, and therefore, an object of an embodiment of the present invention is to reduce communication traffic in a network system having a plurality of image processing apparatuses in which a storage area can be provided for each user.

An image processing apparatus according to one aspect of the present invention is an image processing apparatus configured to provide a storage area for each user. The image processing apparatus includes a calculation portion that calculates a total of a first amount of a storage area of a first user that has been used by a second user and a second amount of a storage area of the second user that has been used by the first use, a determination portion that determines whether or not the total is equal to or greater than a predetermined amount, and a reset portion that performs a reset process for trying again to provide the storage area of the first user and the storage area of the second user in an identical image processing apparatus when the total is determined to be equal to or greater than the predetermined amount in case that the storage area of the first user and the storage area of the second user are provided in different image processing apparatuses.

Preferably, the reset portion may perform the reset process when a speed of communication is less than a predetermined value and the reset portion does not perform the reset process when the speed of communication is equal to or greater than the predetermined value, the communication being performed between the image processing apparatus in which the storage area of the first user is provided and the image processing apparatus in which the storage area of the second user is provided.

Further, the second amount may be an amount of the storage area of the second user that has been used by the first user during a predetermined period of time, and the first amount may be an amount of the storage area of the first user that has been used by the second user during the predetermined period of time.

Further, the first amount may be the number of times when access has been made to the storage area of the first user, and the second amount may be the number of times when access has been made to the storage area of the second user.

Further, the first amount may be total size of data stored in the storage area of the first user that has been used by the second user, and the second amount may be total size of data stored in the storage area of the second user that has been used by the first user.

Moreover, if a time when the first user has used the storage area of the second user is concentrated on a period of time having a predetermined length, the calculation portion may calculate the total excluding an amount used during the period of time, and if a time when the second user has used the storage area of the first user is concentrated on the period of time having a predetermined length, the calculation portion may calculate the total excluding an amount used during the period of time.

Moreover, if the image processing apparatus in which the storage area of the first user is provided includes a particular function and the image processing apparatus in which the storage area of the second user is provided does not include the particular function, the reset portion may perform the reset process by moving the storage area of the second user to the image processing apparatus in which the storage area of the first user is provided. Furthermore, the particular function may be a function that has ever been used by the first user.

In the present disclosure, "use of a storage area" means action of calling data stored (saved) in the storage area, action of saving data in the storage area, action of referring to a list of data stored in the storage area or other action.

The structure described above enables reduction of communication traffic in a network system having a plurality of image processing apparatuses in which a storage area can be provided for each user.

Specifically, a network system is configured by using image processing apparatuses according to an embodiment of the present invention. Then, the image processing apparatus is controlled by a method according to an embodiment of the present invention, or the image processing apparatus is caused to execute a computer program according to an embodiment of the present invention. This enables reduction of communication traffic in the network system.

These and other characteristics and objects of the present invention will become more apparent by the following descriptions of preferred embodiments with reference to drawings.

BRIEF DESCRIPTION OF THE DRAWINGS

FIG. 4 is a diagram showing an example of box information stored in a box information storage portion.

FIG. 5 is a diagram showing an example of functional information stored in a functional information storage portion.

FIG. 6 is a diagram showing an example of job record information stored in a log information storage portion.

FIG. 7 is a diagram showing an example of a structure of a user grouping process portion.

DESCRIPTION OF THE PREFERRED EMBODIMENTS

Figure 1:
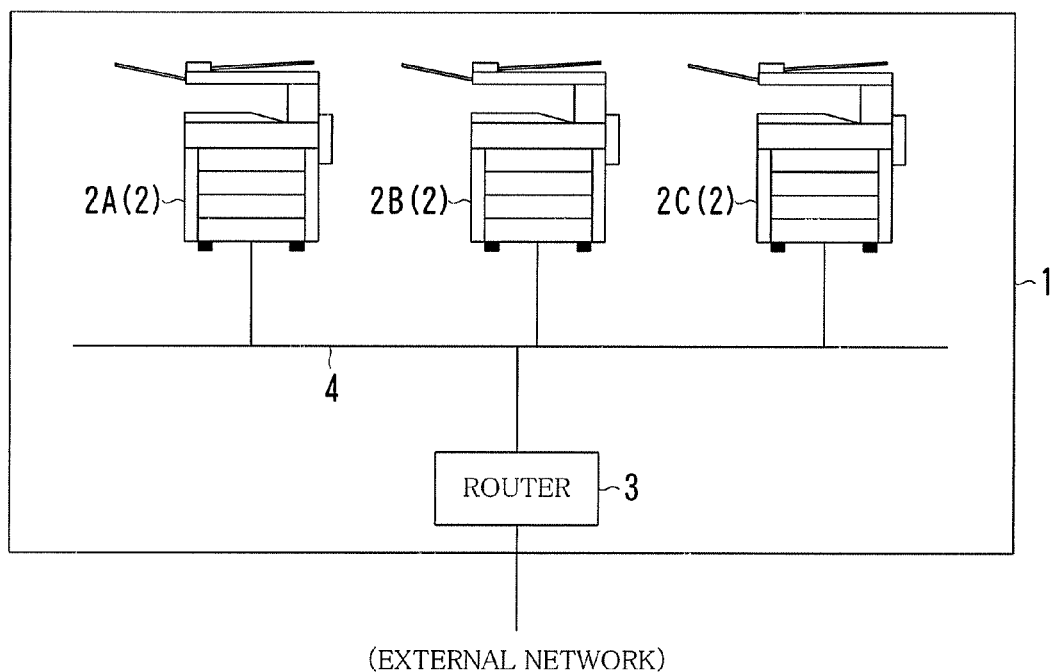
FIG. 1 is a diagram showing an example of the entire configuration of a network system.

Referring to FIG. 1, a network system 1 includes a plurality of image processing apparatuses 2, a router 3 and a communication line 4. The network system 1 is constructed in, for example, an organization such as a government or corporate office or a school.

The image processing apparatuses 2 are connected to each other via the communication line 4 and can exchange data via a protocol, e.g., File Transfer Protocol (FTP) or Server Message Block (SMB). Further, the image processing apparatuses 2 can connect to an apparatus provided in an external network via the router 3 for data exchange.

Each of the image processing apparatuses 2 and the router 3 is given a unique IP address and MAC address.

The following is a description of a case in which three image processing apparatuses 2 are provided in the network system 1. Three of the image processing apparatuses 2 are sometimes respectively referred to as an "image processing apparatus 2A", an "image processing apparatus 2B" and an "image processing apparatus 2C" by way of distinguishing them from each other.

The image processing apparatus 2 is a processing apparatus in which various functions including a copier function, a scanner function, a fax function, a box function, a SCAN-TO-BOX function, a SCAN-TO-SMB function and a SCAN-TO-FTP function are integrated. In general, the image processing apparatuses 2 are sometimes called Multi Function Peripherals (MFPs).

The "box function" is a function to provide each user using the image processing apparatus 2 with a storage area called, for example, a "box" or a "personal box" corresponding to a folder or directory in a personal computer, thereby enabling the user to store document data in the user's own box on a file basis. A box is assigned a box ID for distinguishing the box from other boxes provided in the network system 1 (i.e., any image processing apparatus 2 including the image processing apparatus 2 itself).

The "SCAN-TO-BOX" function is a function to convert an image captured by scanning a printed surface of the original into image data to generate a file and to save the generated file in a box having a box ID designated by a user.

The "SCAN-TO-FTP" function is a function to convert an image captured by scanning a printed surface of the original into image data to generate a file and to transfer, via FTP, the generated file to a storage location based on a URL designated by a user.

The "SCAN-TO-SMB" function is a function to convert an image captured by scanning a printed surface of the original into image data to generate a file and to transfer, via SMB, the generated file to a storage location based on a URL designated by a user.

Figure 2:
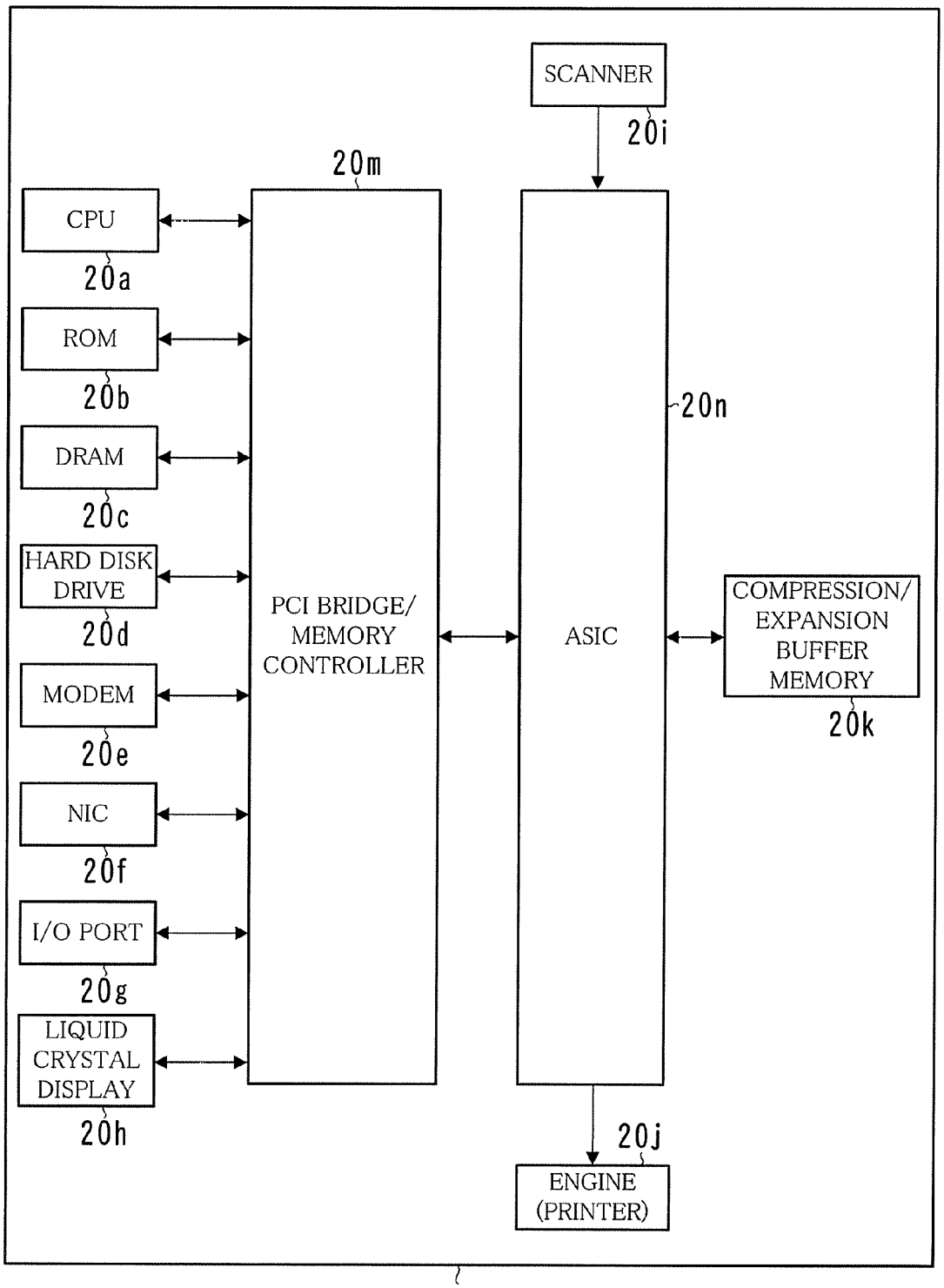
FIG. 2 is a diagram showing an example of a hardware configuration of an image processing apparatus.

Referring to FIG. 2, the image processing apparatus 2 is made up of hardware including a CPU 20a, a ROM 20b, a Dynamic RAM (DRAM) 20c, a hard disk drive 20d, a modem 20e, a Network Interface Card (NIC) 20f, an I/O port 20g, a liquid crystal display 20h, a scanner 20i, a printer 20j, a compression/expansion buffer memory 20k, a PCI bridge/memory controller 20m and an Application Specific Integrated Circuit (ASIC) 20n.

The I/O port 20g is an interface such as USB or RS-232C for connecting to an optional device such as an MO drive or a card reader/writer.

The modem 20e is an interface for performing image data communication with a FAX terminal using FAX protocol through a public line. The Network Interface Card 20f is an interface for performing so-called IP communication with other image processing apparatus 2 or an external device through the communication line 4.

The scanner 20i serves to optically capture an image such as photographs, text, pictures or diagrams depicted on the original, then to create image data.

The compression/expansion buffer memory 20k serves to temporarily store image data obtained by the scanner 20i or image data sent from other device (image data described in Emperor, PostScript or PCL).

The ASIC 20n performs a conversion process from an RGB color space format into a CMYK color space format, a resolution change process, an error diffusion process, a compression process into MH/MR/MMR format or an expansion process on image data stored in the compression/expansion buffer memory 20k.

The printer 20j reproduces an image based on image data that is stored in the compression/expansion buffer memory 20k and subjected to the image process performed by the ASIC 20n and prints the reproduced image on a sheet of paper.

The liquid crystal display 20h is a touch panel liquid crystal display. It displays a screen for providing messages or instructions to a user, a screen for the user to enter desired types of processing and processing conditions, and a screen indicating results of processes performed by the CPU 20a, for example. Further, the liquid crystal display 20h senses a position touched by the user and sends a signal indicating the position to the CPU 20a.

Figure 3:
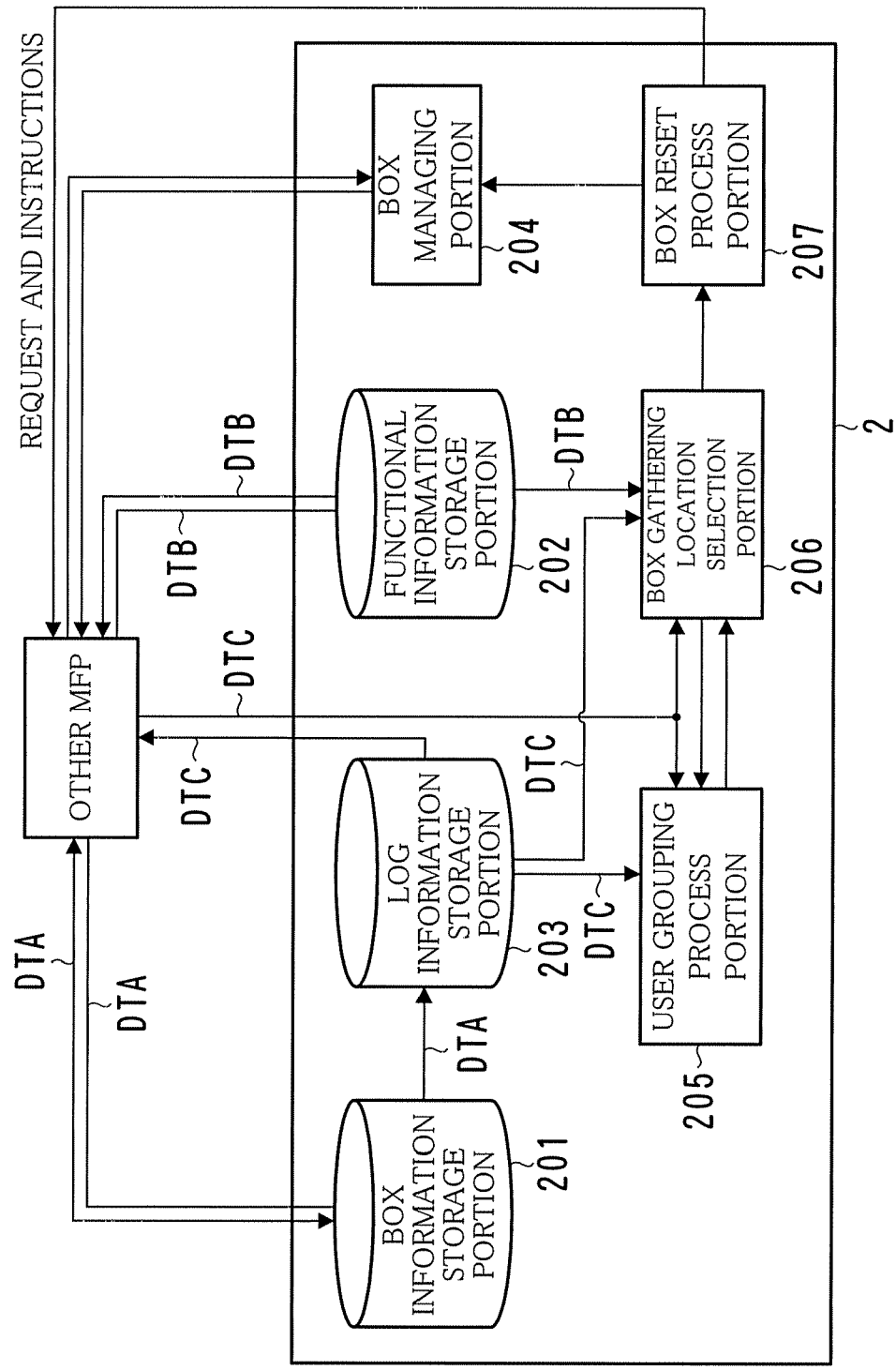
FIG. 3 is a diagram showing an example of a functional configuration of an image processing apparatus.

Referring to FIG. 3, on the ROM 20b or the hard disk drive 20d are stored programs and data for implementing portions such as a box information storage portion 201, a functional information storage portion 202, a log information storage portion 203, a box managing portion 204, a user grouping process portion 205, a box gathering location selection portion 206 and a box reset process portion 207. These programs and data are read out to the DRAM 20c when necessary, and the CPU 20a executes the programs. A part of or all the functions shown in FIG. 3 may be implemented with hardware such as a circuit.

Further, the hard disk drive 20d ensures an area for a box for each user.

The PCI bridge/memory controller 20m performs processes for managing the DRAM 20c, for example, a data writing process to the DRAM 20c, a data reading process from the DRAM 20c and a refresh process of the DRAM 20c.

Each user is given his/her box in any one of the image processing apparatuses 2 in the network system 1. Hereinafter, from the standpoint of a user, an image processing apparatus 2 where his/her box is provided is referred to as a "home MFP". Further, from the standpoint of an image processing apparatus 2, a user who owns his/her box provided in the image processing apparatus 2 itself is referred to as a "home user" and a user other than the home user is referred to as a "non-home user".

The following is a detailed description of process contents of the individual portions of the image processing apparatus 2 shown in FIG. 3 in the case where the network system 1 is constructed in a certain company.

As shown in FIG. 4, the box information storage portion 201 stores box information DTA for each box provided in the image processing apparatus 2 itself or other image processing apparatus 2. The box information DTA indicates a box ID of the box, an IP address and a device ID for identification of the image processing apparatus 2 where the box is provided, and a user ID of a user (employee) who owns the box.

Among the box information DTA stored in the box information storage portion 201, the details of the box information DTA of the box provided in the image processing apparatus 2 itself can be obtained if an inquiry is made to an operating system thereof, for example.

Image processing apparatuses 2 in the network system 1 distribute box information DTA of boxes provided therein to each other. This enables one of the image processing apparatuses 2 to obtain box information DTA of a box provided in the other image processing apparatus 2. The timing of distributing the box information DTA may be a timing when the details of the box information DTA of the image processing apparatus 2 itself are updated or a timing when a request is made by the other image processing apparatus 2.

Another configuration is possible in which any one or more of the image processing apparatuses 2 in the network system 1 is designated as a "master MFP" and each of the image processing apparatuses 2 uploads box information DTA of boxes provided therein into the master MFP. In such a case, the image processing apparatus 2 accesses to the master MFP to download, if necessary, box information DTA of boxes provided in other image processing apparatus 2. Alternatively, the master MFP distributes all the gathered box information DTA to all the image processing apparatuses 2 appropriately.

As shown in FIG. 5, the functional information storage portion 202 stores functional information DTB for the image processing apparatus 2 itself and functional information DTB for each of other image processing apparatuses 2. The functional information DTB shows a list of functions included in the image processing apparatus 2, a device-ID of the image processing apparatus 2 and others.

As with the box information DTA described above, the functional information DTB is also distributed between the image processing apparatuses 2. Alternatively, the functional information DTB may be gathered in the master MFP and be distributed to all the image processing apparatuses 2.

Referring to FIG. 6, the log information storage portion 203 stores job record information DTC for each job performed by the image processing apparatus 2, i.e., a job log. Every time when a job is performed in the image processing apparatus 2, job record information DTC of the job is newly stored in the log information storage portion 203.

In the job record information DTC, "job ID" is identification information for distinguishing the job from other jobs. "Execution date and time" shows date and time when the job was performed. "User ID" shows a user ID of a user who issued instructions for the job.

"Job type" indicates a type of the job. "Supplier box ID" indicates a box ID of a box that is a supplier of data used when the job is performed. "Save destination box ID" shows a box ID of a box where data was saved after performing the job.

The following is examples of job types. "Box data copy" means a job to copy a file saved in a box. More specifically, this job is a job to copy a file saved in a box indicated in "supplier box ID" to save the copied file in a box indicated in "save destination box ID".

Each of "SCAN-TO-BOX", "SCAN-TO-FTP" and "SCAN-TO-SMB" means a job to use the function of the same respective names described above to save, as a file, image data obtained by the scanner 20i in a storage location designate by a user, i.e., in a box indicated in "save destination box ID". In the case of these jobs, nothing is shown in "save destination box ID".

"Box print" means a job to print an image based on a file stored in a box. More specifically, this job is a job to print an image by using a file saved in a box indicated in "supplier box ID". In the case of this job, nothing is shown in "save destination box ID".

"Reference to list in box" is a job to display a list of files saved in a box on the liquid crystal display 20h for user's reference. More specifically, this job is a job to generate a list of files saved in a box indicated in "supplier box ID" to display the list on the liquid crystal display 20h. Nothing is shown in "save destination box ID" in the case of this job either.

Referring back to the description of the remaining items of the job record information DTC, "number of pages" indicates the number of pages of a document reproduced by data that was used at the time of executing the job. "Data size" shows a size of data that was used at the time of executing the job. In the case where, however, a job type of the job is "reference to list in box", nothing is shown in "number of pages".

"Communication start time" and "communication end time" indicate start time and end time of communication respectively in the case where the job involves communication with other image processing apparatus 2. Specifically, the communication is mainly to exchange data relating to the job.

"Used function" shows a function that was used for the job among functions included in the image processing apparatus 2.

Other than those above, the job record information DTC includes information on, for example, the execution result of the job (whether the job was successful or not), a cause when the job failed, a protocol used when the job involves communication (FTP, SMB, E-Mail or the like) or a data name or a file name of data used for the job.

The log information storage portion 203 also stores job record information DTC relating to a job for which no box is used.

Referring back to FIG. 3, the box managing portion 204 performs the following processes relating to management of a box: (a) Generation of a new box in the hard disk drive 20d of the image processing apparatus 2 itself, i.e., in the local hard disk drive 20d. (b) Addition of a file to the box. (c) Call or deletion of a file from the box. (d) Extraction of information on a file (for example, a file name, a box name of the box that is a storage location, a file size and a creation date) saved in the box. (e) Deletion of a box from the local hard disk drive 20d. In addition, the box managing portion 204 performs a process for moving, to the local hard disk drive 20d, a box provided in other image processing apparatus 2 and data in the box.

Referring to FIG. 7, the user grouping process portion 205 includes a box shared amount calculating portion 251, a threshold value excess determining portion 252 and a grouping user determining portion 253. The user grouping process portion 205 performs a process for grouping users, for example, according to the procedure shown in FIG. 8.

Figure 8:
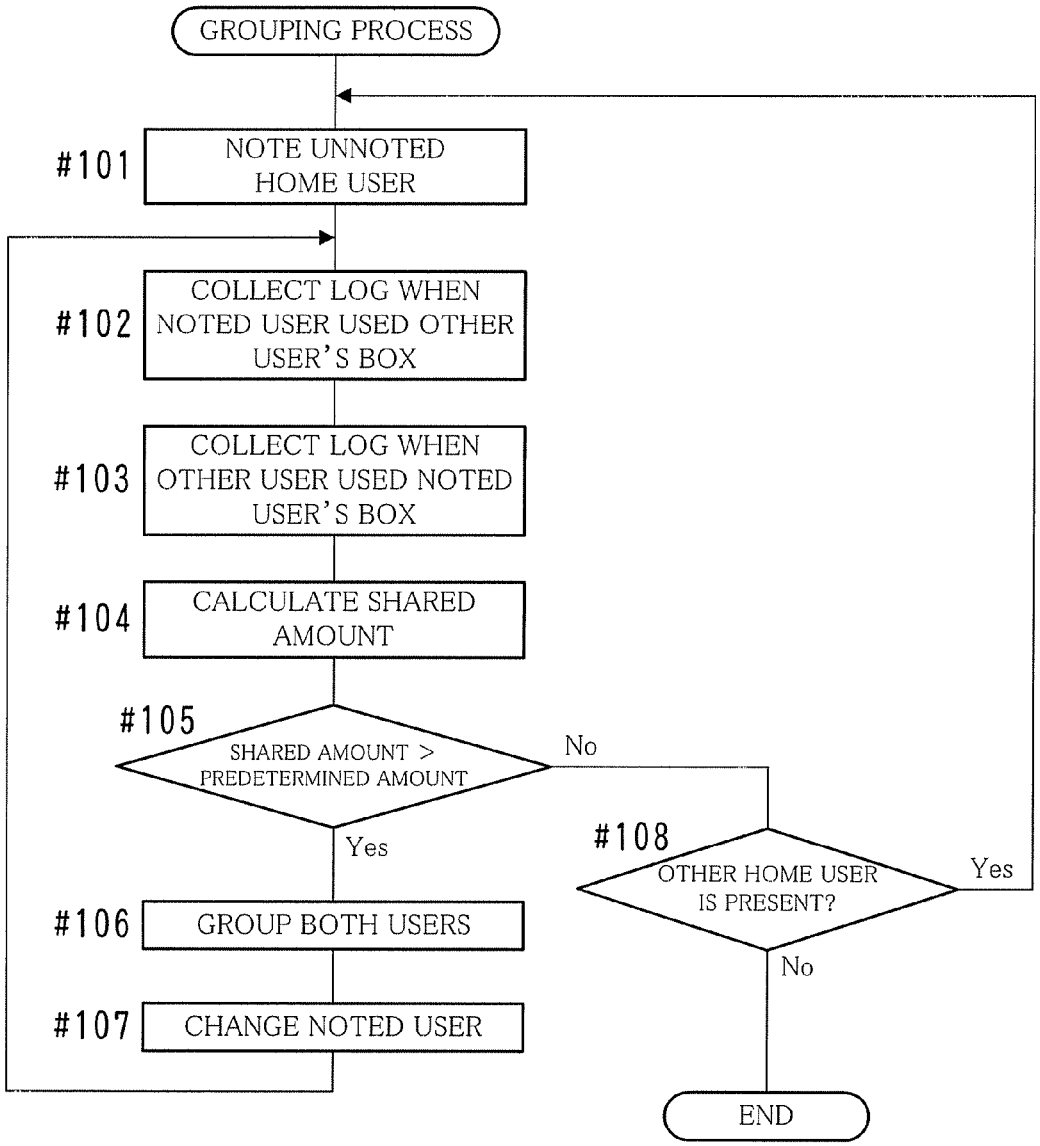
FIG. 8 is a flowchart showing an example of a flow of a grouping process.
Figure 9:
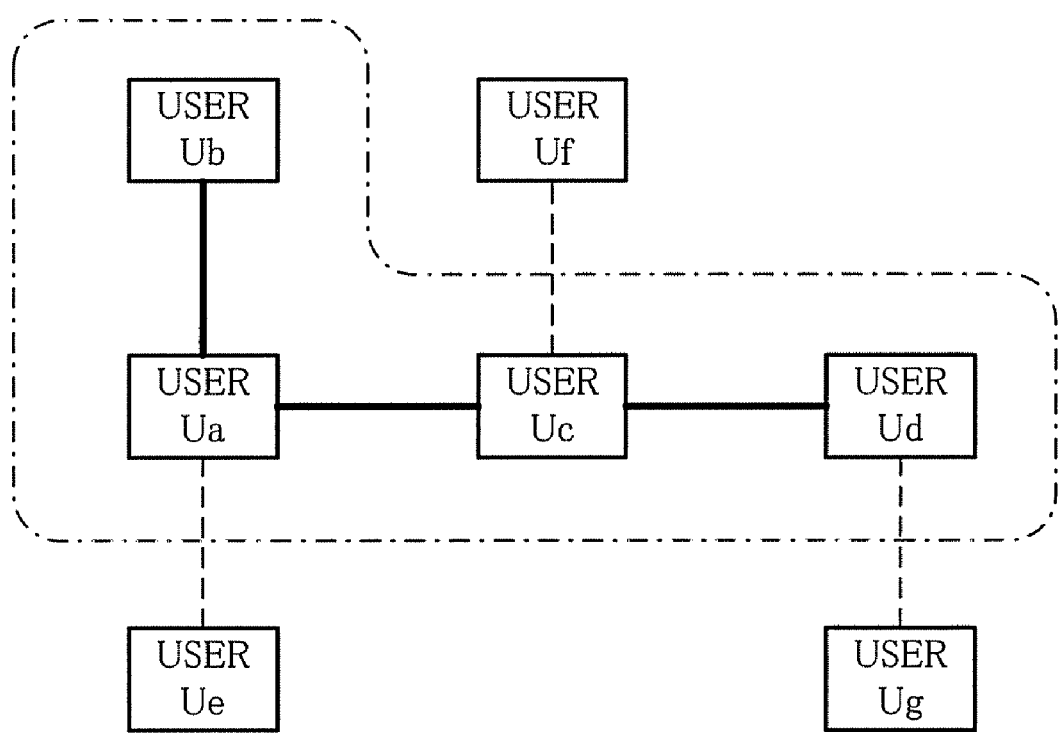
FIG. 9 is a diagram showing an example of grouping based on the relationship of size of a box shared amount.

Referring to FIG. 8, the box shared amount calculating portion 251 notes one home user (#101). Hereinafter, the user thus noted is referred to as a "noted user". Suppose that, for example, a user Ua shown in FIG. 9 is noted.

Log information when the user Ua as a noted user used a box of other user during a predetermined period of time (hereinafter, referred to as a "period Ta") is collected from the log information storage portion 203 (#102). More specifically, job record information DTC is collected that indicates a user ID of the user Ua in the field of "user ID", a box ID of the box of other user in either field of "supplier box ID" or "save destination box ID", and date and time falling within the period Ta in the field of "execution date and time".

In the case where a user is allowed to use an image processing apparatus 2 other than the home MFP, job record information DTC that fulfills the conditions described above is collected from the log information storage portion 203 of other image processing apparatus 2. The same applies to the following description.

Here, suppose that job record information DTC showing the use of boxes of users Ub, Uc and Ue is collected. It is presumed that these three users have some kind of connection with the noted user, i.e., the user Ua. Hereinafter, a user thus presumed is referred to as a "presumed user".

Log information when each presumed user used a box of the user Ua as the noted user during the period Ta is collected from the log information storage portion 203 of the image processing apparatus 2 itself and the log information storage portion 203 of other image processing apparatus 2 (#103). More specifically, job record information DTC is collected that indicates a user ID of the presumed user in the field of "user ID" and a box ID of the box of the user Ua in either field of "supplier box ID" or "save destination box ID".

The record of the use of the boxes, which is indicated in the job record information DTC collected in Step #102 and Step #103, is calculated to determine the sum total that the noted user and each presumed user used each others' boxes (#104). Hereinafter, the sum total that the noted user and the presumed user used each others' boxes is referred to as a "box shared amount".

Here, a box shared amount by the user Ua and the user Ub, i.e., the total of an amount that the user Ua used a box of the user Ub and an amount that the user Ub used the box of the user Ua, a box shared amount by the user Ua and the user Uc, and a box shared amount by the user Ua and the user Ue are determined.

The sum of sizes of data called from a box at the time of executing a job or of data saved in a box at the time of executing a job can be used as the box shared amount. Specifically, for example, suppose that the user Ua causes an image processing apparatus 2 to perform a job using the box of the user Ub three times, and at the time of performing the job, sizes of data called from the box of the user Ub or of data saved therein are "10 MB", "15 MB" and "3 MB" respectively, and the user Ub causes an image processing apparatus 2 to perform a job using the box of the user Ua twice, and at the time of performing the job, sizes of data called from the box of the user Ua or of data saved therein are "8 MB" and "50 MB" respectively. In such a case, the box shared amount by the user Ua and the user Ub is "10 MB+15 MB+3 MB+8 MB+50 MB=86 MB".

Alternatively, the number of times when a box was used may be regarded as the box shared amount. In the case of the example described above, the box shared amount by the user Ua and the user Ub is "3 times+2 times=5 times". The box shared amount may be the number of pages of a document reproduced by data called from a box or data saved in a box at the time of performing a job.

The threshold value excess determining portion 252 determines whether or not the box shared amount thus calculated is equal to or greater than a predetermined amount (hereinafter, referred to as a "predetermined amount Qa") (#105).

If it is determined that the box shared amount is equal to or greater than the predetermined amount Qa (Yes in #105), then the grouping user determining portion 253 groups both the users into one group (#106). If there is a plurality of box shared amounts equal to or greater than the predetermined amount Qa, then the grouping user determining portion 253 groups all users relating to any of the box shared amount into one group.

For example, if the box shared amount by the users Ua and Ub and the box shared amount by the users Ua and Uc are equal to or greater than the predetermined amount Qa and the box shared amount by the users Ua and Ue is less than the predetermined amount Qa, then the grouping user determining portion 253 groups the users Ua, Ub and Uc into one group. Thick solid lines in FIG. 9 show the connection of users relating to the box shared amount equal to or greater than the predetermined amount Qa, while thin dotted lines show the connection of users relating to the box shared amount less than the predetermined amount Qa.

A user grouped into the same group as the noted user is newly noted (#107), and the process shown in Step #102-Step #106 is performed for each newly noted user. In such a case, however, it is not necessary anymore to calculate a box shared amount by the newly noted user and a user who is already grouped together with the newly noted user.

Specifically, in the example shown in FIG. 9, the users Ub and Uc are noted sequentially. Then, a user having a box shared amount with the user Ub equal to or greater than the predetermined amount Qa (however, excluding a user already grouped into the group, i.e., excluding the users Ua and Uc) and a user having a box shared amount with the user Uc equal to or greater than the predetermined amount Qa (however, excluding a user already grouped into the group, i.e., excluding the users Ua and Ub) are searched. The users thus found are added to the group. Further, the found users are newly noted and the same process is performed on the users. This process is performed until no user is found.

As a result, for example, in the case where no user is found as a target of grouping when the user Ub is noted, the user Ud is found when the user Uc is noted, and no user is found as a target of grouping when the user Ud is noted, the users Ua, Ub, Uc and Ud are grouped into one group as shown in the dashed-dotted line of FIG. 9.

If a home user who is not grouped at this time is still present (Yes in #108), then the user grouping process portion 205 notes the home user (#101) and performs the grouping process according to the procedure shown in Step #102-Step #107.

Instead of using the box shared amount, comparison may be made between a predetermined amount (a threshold value) and an amount of other user's box used by a home user. Then, in the case where the used amount is equal to or greater than the predetermined amount, the home user and that other user may be grouped into one group. The same applies to the following description.

Referring back to FIG. 3, the box gathering location selection portion 206 selects an image processing apparatus 2 where boxes of respective users who are grouped into one group by the user grouping process portion 205 should be gathered. For example, an image processing apparatus 2 satisfying both the following Condition A and Condition B is selected.

Condition A: To be an image processing apparatus 2 that is set to be a home MFP by at least one of users belonging to the group.

Condition B: To be an image processing apparatus 2 that currently has a capability to store boxes of all users belonging to the group and files saved therein. More specifically, to be an image processing apparatus 2 that has a hard disk drive 20$d$ currently ensuring a free space equal to or larger than the total size of boxes of all non-home users and files saved therein.

Further, an image processing apparatus 2 satisfying also the following Condition C may be selected.

Condition C: To be an image processing apparatus 2 having a function that is not included in any of other image processing apparatuses 2 satisfying Condition A.

For example, in the case where the image processing apparatuses 2A, 2B and 2C satisfy Condition A and an application program for implementing a function to generate a PDF format file is installed only in the image processing apparatus 2A among the three image processing apparatuses 2A, 2B and 2C, the image processing apparatus 2A satisfies Condition A. Hereinafter, a function that is not included in any of other image processing apparatuses 2 is referred to as a "special function".

The special function can be known by comparing functions indicated in the functional information DTB (see FIG. 5) of each image processing apparatus 2 stored in the functional information storage portion 202.

Further, it is possible to add, to Condition C, the limitation that the special function has been used by a home user of the group. Alternatively, it is possible to add the limitation that a right (an access right) to use the special function is given to a home user of the group.

Further, besides Condition A to Condition C, an image processing apparatus 2 satisfying also the following Condition D may be selected.

Condition D: If there is a plurality of image processing apparatuses 2 satisfying Condition C, to be an image processing apparatus 2 that has a special function with the highest frequency of use (for example, the number of uses per unit period) by a user belonging to a group.

For example, in the case where the image processing apparatuses 2A and 2B satisfy Condition C and the image processing apparatus 2B includes a special function having a frequency of use higher than that of the image processing apparatus 2A, the image processing apparatus 2B is selected.

The frequency of use of the special function can be determined based on information of the item "used function" of the job record information DTC (see FIG. 6) collected at the time of the grouping process by the user grouping process portion 205.

If there is a plurality of image processing apparatuses 2 satisfying all the conditions, then any one of the image processing apparatuses 2 may be selected arbitrarily. The image processing apparatus 2 having the largest number of home users belonging to the group may be selected. The image processing apparatus 2 having the highest specification may be selected.

The box reset process portion 207 performs a process for setting again boxes of all users that are grouped into one group by the user grouping process portion 205 in the image processing apparatus 2 selected by the box gathering location selection portion 206 in the following manner.

In the case where the image processing apparatus 2 itself is selected, other image processing apparatus 2 that is set to be a home MFP by a non-home user among users belonging to the group is requested to move a box of the non-home user and files saved therein. Then, the image processing apparatus 2 causes the box managing portion 204 to newly manage the boxes and files sent from that other image processing apparatus 2. In short, the box of the non-home user and all the contents thereof are caused to be transferred from that other image processing apparatus 2 to the image processing apparatus 2 itself.

In contrast, in the case where other image processing apparatus 2 rather than the image processing apparatus 2 itself is selected, the image processing apparatus 2 itself gives the box managing portion 204 instructions to send a box of a home user among users belonging to the group and files saved therein to that other image processing apparatus 2 (the selected image processing apparatus 2).

For example, in the case where the user Ua and the user Ub who set the image processing apparatus 2A itself to be a home MFP and the user Uc who sets the image processing apparatus 2B to be a home MFP are grouped into one group, if the image processing apparatus 2A itself is selected by the box gathering location selection portion 206, then the box reset process portion 207 of the image processing apparatus 2A requests the image processing apparatus 2B to move a box of the user Uc and all the contents thereof to the image processing apparatus 2A. In contrast, if the image processing apparatus 2B is selected, then boxes of the users Ua and Ub and all the contents thereof are moved to the image processing apparatus 2B.

Figure 10A:
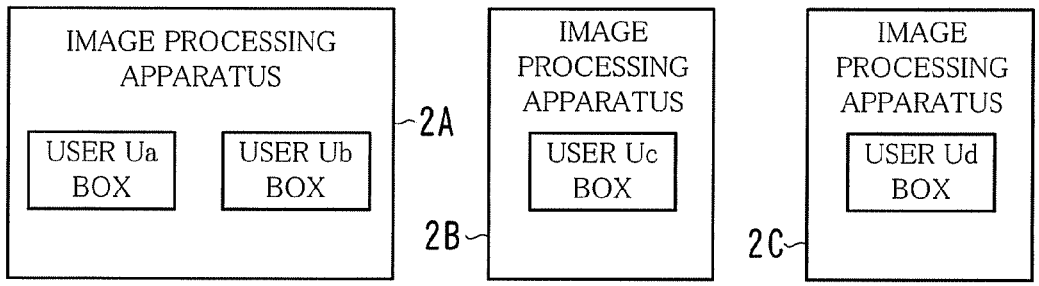
FIGS. 10A-10C are diagrams showing examples of a method for resetting a box.
Figure 10B:
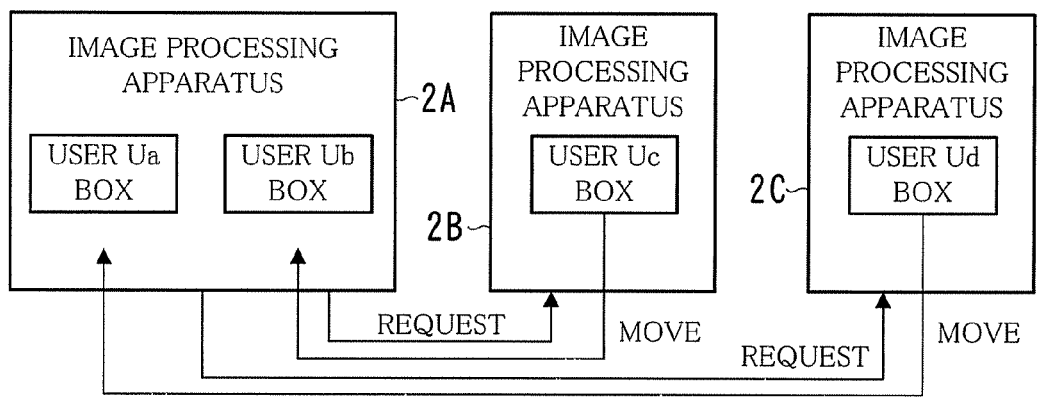
Figure 10C:
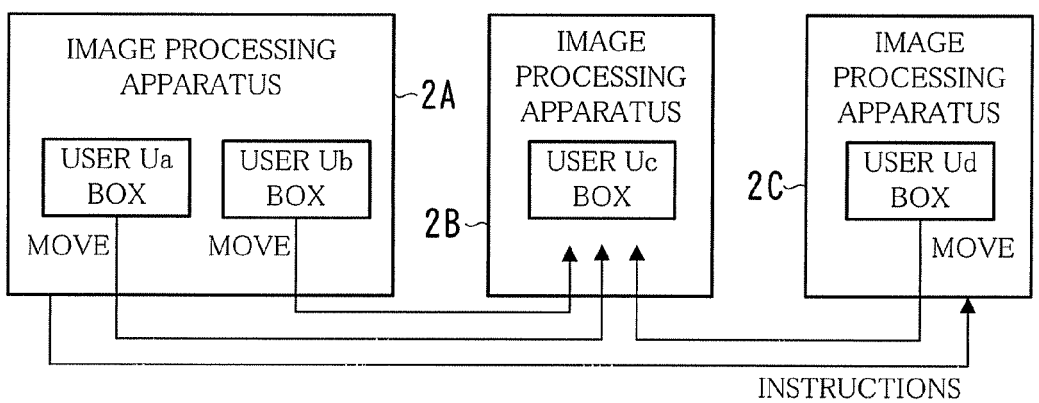

In the case where three or more image processing apparatuses 2 are involved, a process is performed as follows. For example, as shown in FIG. 10A, when the user Ua and the user Ub who set the image processing apparatus 2A itself to be a home MFP, the user Uc who sets the image processing apparatus 2B to be a home MFP and the user Ud who sets the image processing apparatus 2C to be a home MFP are grouped into one group, if the image processing apparatus 2A itself is selected, then, as shown in FIG. 10B, the box reset process portion 207 of the image processing apparatus 2A requests the image processing apparatus 2B to move the box of the user Uc and all the contents thereof to the image processing apparatus 2A and requests the image processing apparatus 2C to move a box of the user Ud and all the contents thereof to the image processing apparatus 2A. In contrast, if the image processing apparatus 2B is selected, then boxes of the users Ua and Ub and all the contents thereof are moved to the image processing apparatus 2B as shown in FIG. 10C. Further, the image processing apparatus 2C is requested to move the box of the user Ud and all the contents thereof to the image processing apparatus 2B.

A user who owns a box determined to be moved may be informed to that effect and, after obtaining permission from the user, the box may be moved.

In the image processing apparatus 2 to which a box is moved, a case may arise in which a file saved in a box that existed therein before is the same as a file saved in the box that has been sent thereto. In such a case, the file may be deleted from one of the boxes and instead link information of the file saved in the other box (information corresponding to a shortcut of Windows (registered trademark) may be saved. Thereby, recording media resources can be saved.

Figure 11:
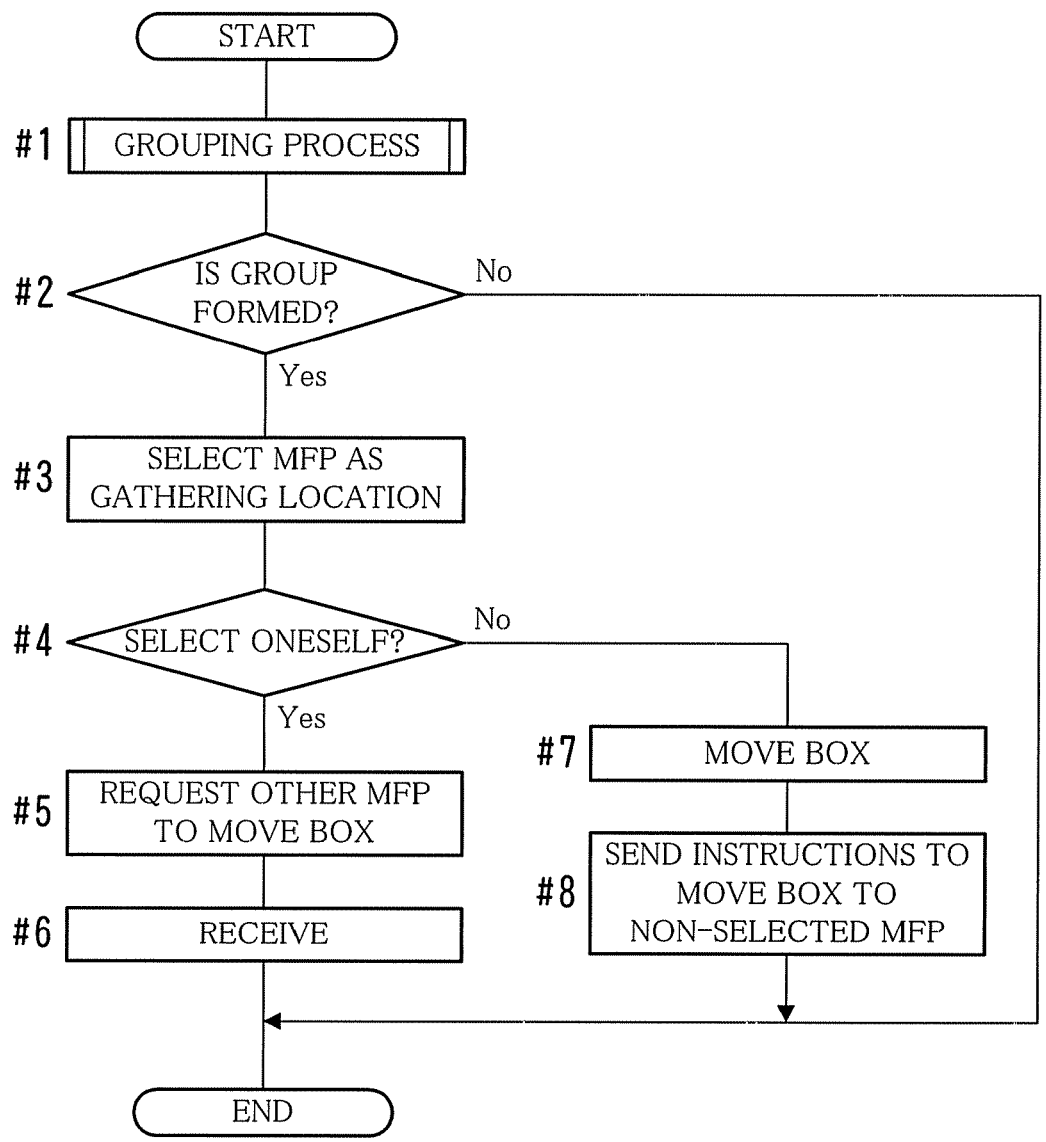
FIG. 11 is a flowchart showing an example of the entire process flow for moving a box.

FIG. 11 is a flowchart showing an example of the entire process flow for moving a box.

Here, a description is provided of the case where a box reset process is performed in the image processing apparatus 2A with reference to the flowchart shown in FIG. 11.

The image processing apparatus 2A generally performs a job based on instructions given from a user and accumulates job record information DTC of the job in the log information storage portion 203 (see FIG. 6). The image processing apparatus 2A performs a box reset process periodically or when instructions are given from an administrator.

Referring to FIG. 11, the image processing apparatus 2A performs a grouping process of users (#1). The procedure of this process is as described earlier with reference to FIG. 8.

If a group is formed (Yes in #2), an image processing apparatus 2 where boxes of users belonging to the group should be gathered is selected by, for example, searching an image processing apparatus 2 satisfying Condition A through Condition D described above (#3).

If the image processing apparatus 2A itself is selected (Yes in #4), then a home MFP of a non-home user among the users belonging to the group is requested to move a box of the non-home user and all the contents thereof to the image processing apparatus 2A (#5). As a result, boxes are gathered in the image processing apparatus 2A as described earlier with reference to FIG. 10B.

In contrast, if other image processing apparatus 2 is selected (No in #4), then a box of a home user among the users belonging to the group is moved to the selected image processing apparatus 2 (#7). Further, image processing apparatuses 2 that are not selected are instructed to move boxes of the users belonging to the group to the selected image processing apparatus 2 (#8).

As described earlier with reference to FIG. 10C, for example, if the image processing apparatus 2B is selected, then a box of a home user of the image processing apparatus 2A is moved to the image processing apparatus 2B and the image processing apparatus 2C is instructed to move a box of a home user of the image processing apparatus 2C among the users belonging to the group to the image processing apparatus 2B.

In this way, the box reset process in the image processing apparatus 2A is completed. In the case where a reset process is performed in other image processing apparatus 2, a box is sometimes transferred from the other image processing apparatus 2 to the image processing apparatus 2A or a request or instructions to move a box is sometimes given to the image processing apparatus 2A. If a box is transferred, then the image processing apparatus 2A receives the box and, after that, manages the same. If the image processing apparatus 2A is requested or instructed to move a box, then it follows the request or instructions.

Along with the movement of a box, a home MFP of a user is also changed. If a box of the user Ua is moved from the image processing apparatus 2A to the image processing apparatus 2B, for example, then a home MFP of the user Ua is changed from the image processing apparatus 2A to the image processing apparatus 2B.

Further, along with the movement of a box, it is possible to move, from a home MFP before change to a home MFP after change, various information on a user of the box, e.g., a font size and a language to be displayed on the liquid crystal display 20h, setup information of a use environment relating to an initial screen or the like, user account information and access right information.

According to this embodiment, in the case where a plurality of users use each others' boxes at an amount equal to or greater than a predetermined amount, these boxes can be provided again in one image processing apparatus 2. This can reduce communication traffic caused by the use of each others' boxes, leading to the reduction in communication traffic of the entire network system 1. In addition, these users can be grouped based on a history of the past jobs. Accordingly, communication traffic of the entire network system 1 can be reduced without troubling an administrator.

The use of the network system 1 in an organization such as a company enables gathering of boxes that are frequently used by users who probably conduct the same operation in one image processing apparatus 2.

[Modification of Grouping]

In this embodiment, users to be grouped are determined based only on a box shared amount by users. However, the following conditions may be added for the determination.

For example, even if a box shared amount by users is equal to or greater than the predetermined amount Qa, in the case where a communication speed between image processing apparatuses 2 where boxes of the respective users are provided is equal to or greater than a predetermined value, grouping of the users may not be performed. Because if a communication speed is great enough, a communication line resource for communication traffic caused by sharing boxes, i.e., a so-called band can be easily ensured and a grouping effect is small.

In the case where use is concentrated only on a short period of the period Ta, a box shared amount may be calculated without any regard for the use during the short period. This can eliminate temporary used amount due to an error in operation or a failure, resulting in the proper determination.

A box shared amount may be calculated without any regard for the use during a period of time during which communication traffic is unoccupied (for example, late night hours after most employees come home). Because even if communication traffic between specific image processing apparatuses 2 is increased somewhat, the possibility of adverse effects causing the shortage of a resource in the entire network system 1 is low.

In the case where the size of a group is too large, a case may arise in which management of boxes is concentrated in one image processing apparatus 2. To avoid such a situation, if the number of people in one group exceeds a predetermined number, the predetermined amount Qa may be increased and a grouping process may be performed again. Differently, the period Ta may be shortened and a grouping process may be performed again. Differently, a grouping process may be performed preferentially on users who use each others' boxes via a communication line (i.e., users having high communication traffic).

[Example of the Case where an Unmovable Box Exists]

Figure 12A:
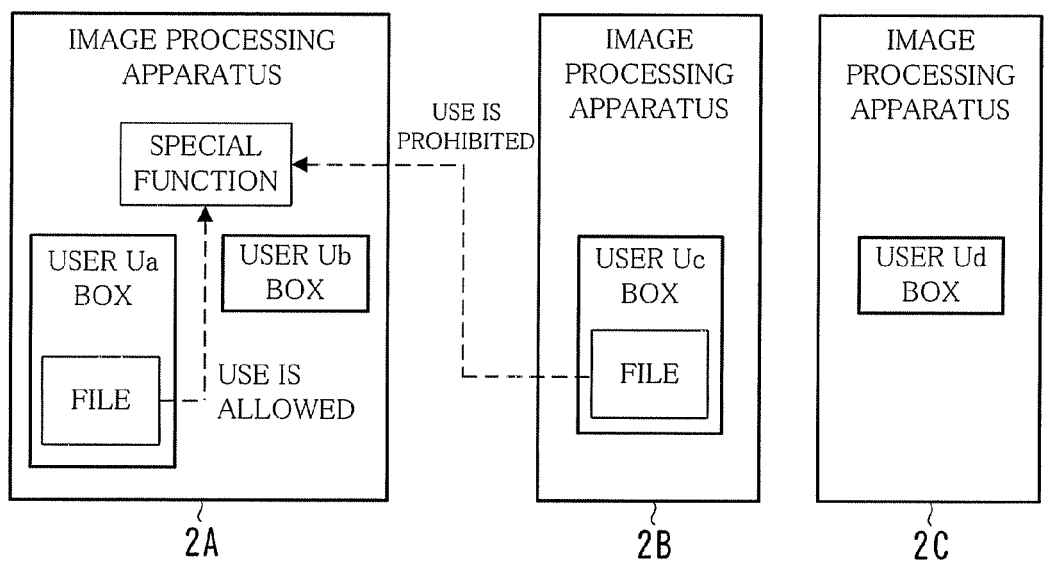
FIGS. 12A and 12B are diagrams showing modifications of a method for resetting a box when users are grouped.
Figure 12B:
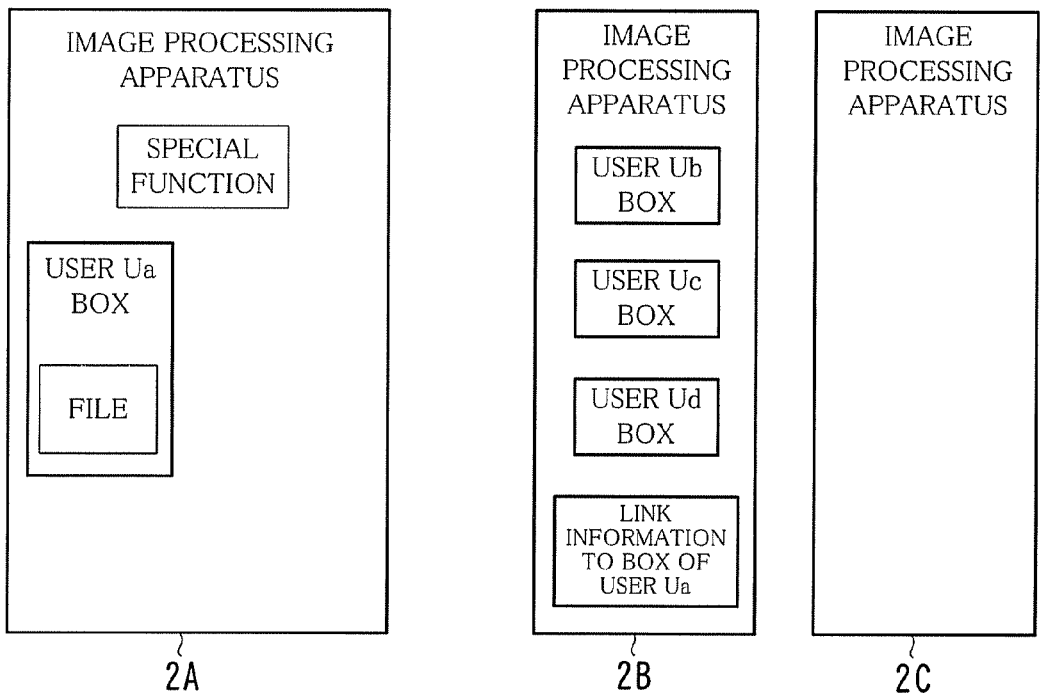

FIGS. 12A and 12B are diagrams showing modifications of a method for resetting a box when the users Ua, Ub, Uc and Ud are grouped.

The movement of a box may inconvenience a user who owns the box. As shown in FIG. 12A, the inconvenient situation is, for example, the case where the use Ua who sets the image processing apparatus 2A to be a home MFP and needs to use a special function equipped only with the image processing apparatus 2A; however, the special function prohibits a file saved in other image processing apparatus 2A from being used and allows the use of only a file saved in the local box.

Under such a situation, if the image processing apparatus 2B is selected as a location where boxes should be gathered, it is desirable that, as shown in FIG. 12B, information that can identify a box of the user Ua on the network, e.g., a URL is generated as link information in the image processing apparatus 2B and the box of the user Ua is not moved. Then, the link information may be used like a shortcut of Windows or an alias of MAC OS. Further, a list of files saved in the box of the user Ua may be given to the image processing apparatus 2B.

[Grouping with Master MFP]

Figure 13:
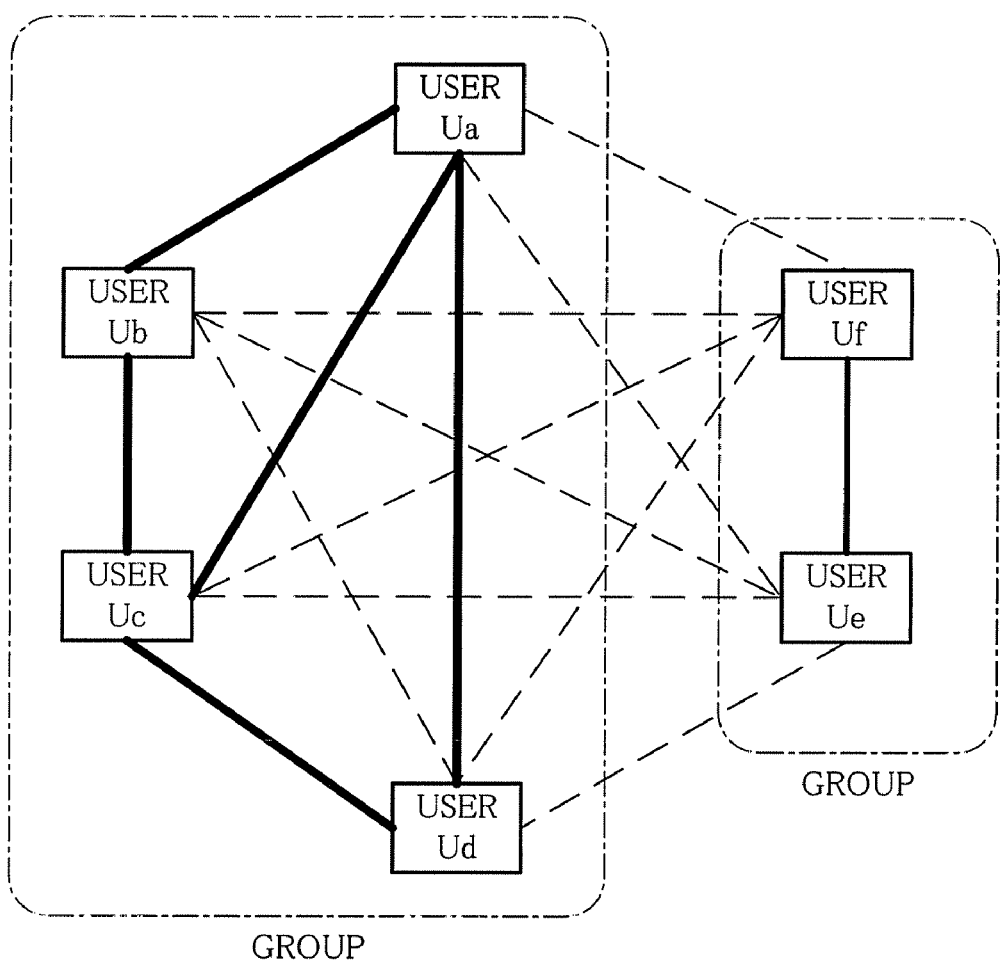
FIG. 13 is a diagram showing a modification of the grouping process.

FIG. 13 is a diagram showing a modification of the grouping process.

In the present embodiment, any image processing apparatus 2 performs a grouping process. Instead, however, another configuration is possible in which a master MFP performs the grouping process. In such a case, the master MFP collects job record information DTC (see FIG. 6) of jobs performed during the period Ta from all of the image processing apparatuses 2. As shown in line segments of FIG. 13, all combinations of two users (i.e., a pair) are determined. A box shared amount is calculated for each combination based on the collected job record information DTC. Then, grouping is performed based on the box shared amount as shown in dashed-dotted lines of FIG. 13. Note that thick line segments show pairs relating to a box shared amount equal to or greater than the predetermined amount Qa, while thin line segments show pairs relating to a box shared amount lower than the predetermined amount Qa.

In the case where a user who can belong to a plurality of groups is present, the user may be grouped with, for example, the other end relating to the greatest box shared amount among box shared amounts by the user.

In the embodiments described above, an MFP is illustrated as an image processing apparatus according to the present invention. The present invention, however, can apply to a device other than the MFP as long as it is an image processing apparatus having a box function. The present invention can apply to, for example, an image processing apparatus such as a copier, a printer or a facsimile machine.

In the embodiments described above, the overall configuration of the image processing apparatus 2, the configurations of various portions thereof, the details of processing, the processing order, the structure of the box information DTA, the functional information DTB and the job record information DTC, and the like may be changed as needed, in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus configured to provide a storage area for each user, the image processing apparatus comprising:
   a calculation portion that calculates a total of a first amount of a storage area of a first user that has been used by a second user and a second amount of a storage area of the second user that has been used by the first user;
   a determination portion that determines whether or not the total is equal to or greater than a predetermined amount; and
   a reset portion that performs a reset process for trying again to provide the storage area of the first user and the storage area of the second user in an identical image processing apparatus when the total is determined to be equal to or greater than the predetermined amount in case that the storage area of the first user and the storage area of the second user are provided in different image processing apparatuses.

2. The image processing apparatus according to claim 1, wherein the reset portion performs the reset process when a speed of communication is less than a predetermined value and the reset portion does not perform the reset process when the speed of communication is equal to or greater than the predetermined value, the communication being performed between the image processing apparatus in which the storage area of the first user is provided and the image processing apparatus in which the storage area of the second user is provided.

3. The image processing apparatus according to claim 1, wherein
   the second amount is an amount of the storage area of the second user that has been used by the first user during a predetermined period of time, and
   the first amount is an amount of the storage area of the first user that has been used by the second user during the predetermined period of time.

4. The image processing apparatus according to claim 1, wherein
   the first amount is the number of times when access has been made to the storage area of the first user, and
   the second amount is the number of times when access has been made to the storage area of the second user.

5. The image processing apparatus according to claim 1, wherein
the first amount is total size of data stored in the storage area of the first user that has been used by the second user, and
the second amount is total size of data stored in the storage area of the second user that has been used by the first user.

6. The image processing apparatus according to claim 1, wherein if a time when the first user has used the storage area of the second user is concentrated on a period of time having a predetermined length, the calculation portion calculates the total excluding an amount used during the period of time, and if a time when the second user has used the storage area of the first user is concentrated on the period of time having a predetermined length, the calculation portion calculates the total excluding an amount used during the period of time.

7. The image processing apparatus according to claim 1, wherein if the image processing apparatus in which the storage area of the first user is provided includes a particular function and the image processing apparatus in which the storage area of the second user is provided does not include the particular function, the reset portion performs the reset process by moving the storage area of the second user to the image processing apparatus in which the storage area of the first user is provided.

8. The image processing apparatus according to claim 7, wherein the particular function is a function that has ever been used by the first user.

9. A method for managing a storage area provided for each user in an image processing apparatus, the method comprising:
performing a calculation process for calculating a total of a first amount of a storage area of a first user that has been used by a second user and a second amount of a storage area of the second user that has been used by the first user;
performing a determination process for determining whether or not the total is equal to or greater than a predetermined amount; and
performing a reset process for trying again to provide the storage area of the first user and the storage area of the second user in an identical image processing apparatus when the total is determined to be equal to or greater than the predetermined amount in case that the storage area of the first user and the storage area of the second user are provided in different image processing apparatuses.

10. The method according to claim 9, wherein the reset process is performed when a speed of communication is less than a predetermined value and the reset process is not performed when the speed of communication is equal to or greater than the predetermined value, the communication being performed between the image processing apparatus in which the storage area of the first user is provided and the image processing apparatus in which the storage area of the second user is provided.

11. The method according to claim 9, wherein
the second amount is an amount of the storage area of the second user that has been used by the first user during a predetermined period of time, and
the first amount is an amount of the storage area of the first user that has been used by the second user during the predetermined period of time.

12. The method according to claim 9, wherein
the first amount is the number of times when access has been made to the storage area of the first user, and
the second amount is the number of times when access has been made to the storage area of the second user.

13. The method according to claim 9, wherein
the first amount is total size of data stored in the storage area of the first user that has been used by the second user, and
the second amount is total size of data stored in the storage area of the second user that has been used by the first user.

14. The method according to claim 9, wherein, in the calculation process, if a time when the first user has used the storage area of the second user is concentrated on a period of time having a predetermined length, the total excluding an amount used during the period of time is calculated, and if a time when the second user has used the storage area of the first user is concentrated on the period of time having a predetermined length, the total excluding an amount used during the period of time is calculated.

15. The method according to claim 9, wherein if the image processing apparatus in which the storage area of the first user is provided includes a particular function and the image processing apparatus in which the storage area of the second user is provided does not include the particular function, the reset process is performed by moving the storage area of the second user to the image processing apparatus in which the storage area of the first user is provided.

16. The method according to claim 15, wherein the particular function is a function that has ever been used by the first user.

17. A non-transitory computer program stored on a computer readable medium for controlling an image processing apparatus configured to provide a storage area for each user, the computer program letting the image processing apparatus perform a process comprising:
calculating a total of a first amount of a storage area of a first user that has been used by a second user and a second amount of a storage area of the second user that has been used by the first user;
determining whether or not the total is equal to or greater than a predetermined amount; and
performing a reset process for trying again to provide the storage area of the first user and the storage area of the second user in an identical image processing apparatus when the total is determined to be equal to or greater than the predetermined amount in case that the storage area of the first user and the storage area of the second user are provided in different image processing apparatuses.

* * * * *